(12) United States Patent
Karatzoglou et al.

(10) Patent No.: US 8,935,303 B2
(45) Date of Patent: Jan. 13, 2015

(54) METHOD AND SYSTEM OF OPTIMIZING A RANKED LIST OF RECOMMENDED ITEMS

(71) Applicants: Alexandros Karatzoglou, Barcelona (ES); Linas Baltrunas, Barcelona (ES)

(72) Inventors: Alexandros Karatzoglou, Barcelona (ES); Linas Baltrunas, Barcelona (ES)

(73) Assignee: Telefonica, S.A., Madrid (ES)

( * ) Notice: Subject to any disclaimer, the term of this patent is extended or adjusted under 35 U.S.C. 154(b) by 62 days.

(21) Appl. No.: 13/729,139

(22) Filed: Dec. 28, 2012

(65) Prior Publication Data
US 2014/0188865 A1    Jul. 3, 2014

(51) Int. Cl.
*G06F 17/30* (2006.01)
(52) U.S. Cl.
CPC .................................. *G06F 17/3053* (2013.01)
USPC ........... 707/813; 707/640; 707/661; 707/689; 707/690; 707/790

(58) Field of Classification Search
USPC ........ 707/607, 640, 661, 689, 690, 703, 790, 707/813
See application file for complete search history.

(56) References Cited

U.S. PATENT DOCUMENTS

2012/0110179 A1* 5/2012 van Coppenolle et al. ... 709/225

FOREIGN PATENT DOCUMENTS

WO    WO 2012/126741 A2    9/2012

* cited by examiner

*Primary Examiner* — Sana Al Hashemi
(74) *Attorney, Agent, or Firm* — Gary J. Gershik; Cooper & Dunham LLP

(57) ABSTRACT

A method and system of optimizing a ranked list (5) of recommended items that is based in a multidimensional data set (2) comprising context-aware information about the of a plurality of users and a plurality of items. A mathematical recommendation model (3) is trained with the multidimensional data set (2) by applying a smooth objective function that allows the use of fast optimizing algorithm and that quantifies the relevance of the ranked lists provided by an optimization algorithm.

18 Claims, 3 Drawing Sheets

METHOD AND SYSTEM OF OPTIMIZING A RANKED LIST OF RECOMMENDED ITEMS

FIELD OF THE INVENTION

The present invention has its application within the information retrieval sector, and especially, in the area of context-aware recommendations.

BACKGROUND OF THE INVENTION

Related Art

In the past years, there has been an increasing interest in the information retrieval (IR) sector for developing recommendation engines designed to suggest different items (products or services) to users, according to the habits, preferences and behaviour of said users. Recommendation engines are typically based in collaborative filtering (CF) methods, which compare item interactions of the user with those of other users of the same recommendation engine. This kind of recommendation systems provide a list of items that the user may find relevant (such as movies the user may enjoy, applications the user may find useful at a given scenario, etc.), the list being either ranked in order of predicted relevance, or just a mere binary classification between recommended and non recommended items.

In order to retrieve information about previous interactions of a user with the items of the recommendation system, implicit and/or explicit feedback can be used. Explicit feedback is any information actively provided by the user, such as requests or ratings. Implicit feedback is any other information extracted from the activity of the user, such as what items the user has purchased or used, where the user has clicked or moved the mouse, etc.

Typically, recommendation systems use the information of interactions of users with the different items to generate a recommendation model in which a score is provided to each combination of user and item. The score represents a prediction of the relevance of the item to the user, and can be particularized for different scenarios. In order to develop context-aware recommendations (CAR), the interactions between the user and the items are categorized according to different context variables that describe the scenario in which the interaction takes place (for example, the time of day in which the interaction occurs, whether the user is at home or at work, etc.). In this case, the recommendation model provides a score for each combination of user, item and context, wherein a context is a combination of values of all the context variables incorporated in the recommendation model.

In order to measure the relevance of a recommended list of items, various metrics can be used. A first metric is the area under the curve (AUC) of a relative operation characteristic (ROC) curve. The ROC curve is defined as the true positive rate (in this case, the rate of recommended items that are actually relevant to the user) as a function of the false positive rate. Hence, the greater the AUC is, the better the recommended list becomes. This metric can be used as an objective function of an optimization algorithm, in order to compute a recommendation model that maximizes said AUC, and therefore, the relevance of the items in the list. However, given the binary nature of the items that define the ROC (true or false positive, that is, whether a recommended item is actually relevant), the ROC curve and the AUC functions present discontinuities that prevent the use of fast optimization algorithms or increase their computational load.

The AUC metric is a good measurement for lists of non ranked items, since all the items of the list are equally weighed, but does not provide a good measurement when items are ranked. In the case of ranked lists, the relevance of the top-ranked items is crucial, as a user typically considers only a few items at the top of the recommendation list. In this case, a mean average precision (MAP) metric provides a more representative result. MAP provides a quality measurement of the list, by quantifying the relevance of the items recommended in the list with a top-heavy bias. However, the MAP metric present function discontinuities that greatly increase the computational load of optimization algorithms. As a consequence, only a small number of users, items and contexts can be considered in the optimization algorithm, since escalating these parameters results in a great increase of the computational load and unreasonable computing times. A lower number of users and items result in a less relevant recommendation list and a smaller-scale system, while a lower number of contexts (that is, less context variables, and/or context variables with fewer possible values) prevents the system from adapting its recommendations to different scenarios the user may encounter.

WO 2012/126741 presents a context-aware recommendation method which uses implicit user feedback to build a multi-dimensional data set that comprises information about the number of interactions of each user with each item under a context defined by one or more context variables. The data set is then factorized into multiple matrices, using an optimization algorithm that minimizes an objective function over the whole data set. The objective function proposed by this method is defined by a variable that takes into account whether the user has interacted with the item under a given context, the number of interactions, and the number of items the user has interacted with in said context. The objective function is optimized by different iterations of an alternating least square algorithm. However, despite this recommendation method optimizes the data set factorization, this optimization is only based on the values of the training data set, and does not take into account the overall relevance of the resulting ranked lists, nor the relative position of the recommended items in the list, which can cause for items with a low relevance to end up the high-rank end of the list, and in general, may result in recommendation lists with a reduced average relevance.

Therefore, there is a need for a method of optimizing recommendation lists that provides highly relevant context-aware ranked lists of recommended items based on implicit user feedback, with a Low computational load that allows to escalate the data set to numerous users and items under various contexts.

SUMMARY OF THE INVENTION

The current invention solves the aforementioned problems by disclosing a method, system and computer program that provides an optimized ranked list of recommended items (such as movies, music, mobile applications, etc. Or any other kind of items), taking into account context-aware information of previous interactions of multiple users with a set of items. By using a differentiable objective function with no discontinuities that takes into account the resulting average relevance of the resulting ranked lists, a fast and efficient optimization is performed, improving the relevance of the results.

In the first aspect of the present invention, a method of optimizing ranked lists is disclosed. The method is based on the computation of a recommendation model using a multi-dimensional training data set. The multidimensional data set comprises information of interactions of a plurality of users with a plurality of items, under a plurality of contexts. The plurality of contexts may include one or more context variables with multiple possible values. If more than one context variable are included, all the context variables may be included in a single dimension of a three-dimensional data set, that is, a three-dimensional tensor whose axis are users, items and context. Since the computational load of the optimization algorithms performed on the data set depends on the number of dimension of said data set, by including all the context variables in a single dimension, the overall speed and efficiency of the ranked list optimization method is improved.

Also preferably, the multidimensional data set is a binary data set, in which a '1' value means that a given user has interacted with a given item under a given context, and a '0' value means that said given user has not interacted with the given item under the given context. By using binary data, the optimization algorithms applied to the data set present a much lower computational load, allowing the method of the invention to work with a greater number of users, items and contexts in a more efficient manner.

The information about the interactions may be obtained from implicit feedback from the user, that is, the interactions are determined from the behaviour of the user, without requiring explicit instructions or actively asking the user for information or ratings. These interactions may comprise, for example, any of the following: a click, a mouse movements, a purchase, an installation of an application, a browsing history, an usage history and a search pattern. Also preferably, the context comprise at least one context variable selected from: time, date, season, location, activity, weather, emotional state, social network, user device, company and speed. This way, without requiring any explicit instruction or feedback from the user, the recommendations of the ranked list automatically adapt to the context in which a given user is at the moment the recommendation is performed.

Using the multidimensional training data set, a recommendation model is computed. The recommendation model is a mathematical model that assigns each combination of user, item and context a numerical score that quantifies the relevance of the item to the user in that context. The recommendation model is computed by applying an optimization algorithm to the multidimensional data set, wherein said optimization algorithm maximizes an objective function quantifying to the average relevance of the items recommended in the ranked list for each user and context, based on the scores of the items of said ranked lists. Obviously, if the objective function gives lower values to items with a greater relevance, the optimization algorithm minimizes the objective function instead.

In order to allow using large amounts of data to train the recommendation model, the optimization algorithm needs to be fast and present a low computational load. In conventional ranked list optimization algorithms, binary conditions are used to define the relevance measurement metric (such as whether an item is ranked higher than another item in the ranked list), as well as discontinuous functions (for example, the rank in the list of each item). The present invention overcomes this problem by using optimization algorithms whose objective functions is a smooth function that the relevance of the items recommended in the ranked list, averaged over users and over contexts. A smooth function is a continuous function with infinite continuous derivatives. Optimization algorithms for smooth functions are faster than those for discontinuous functions, or functions with discontinuous derivatives. For example, a gradient ascend optimization algorithm can therefore be applied.

Notice that the present invention uses as objective function of the optimization algorithm a measurement of the relevance of the ranked lists generated by the recommendation model, instead of just using the straightforward values of the data set. This way, the recommendation model not only is adjusted to fit the data set, but it also provides the optimal ranked lists in terms of relevance to the user. Therefore, the relevance of the ranked list provided to each user is greatly improved compared to other recommendation methods in the state of the art.

Preferably, the function is top biased, that is, the relevance of each item of the ranked list is weighed according to their rank, biasing the optimization algorithm towards ranking the most relevant items at the top of the ranked list. Preferably, said top-biased function approximates a Mean Average Precision (MAP), that is, the smooth function also measures the precision of the items of a ranked list, averaged along users and context, and presents the same top heavy bias characteristics of the MAP function. In order to perform this approximation, binary conditions that determine whether an item is ranked higher than another item in the list, are preferably approximated by a continuous and differentiable function which depends on the difference of scores of the two items. In the MAP approximation, the rank of an item is also preferably approximated by a continuous and differentiable function which depends on the score of said item.

In order to further reduce the computational load of the optimization algorithm, and further increase the amount of data said optimization algorithm can work with, the recommendation model is preferably factorized into a plurality of bidimensional (two-dimension) matrices. This factorization results in as many bidimensional matrices as dimensions of the original data set (typically three), with no three-dimensional term or higher in the factorization.

With the described method, a large data set can be used in the optimization algorithm in an efficient manner. However, in scenarios in which a large amount of items are comprised in the data set, with the ranked list being substantially shorter than the total amount of items, the number of non recommended items becomes the bottleneck of the computational load of the optimization algorithm. To mitigate this effect, the method preferably comprises using only a subset of items from the plurality of items in the optimization of the recommendation model. More preferably, for each user and context, said subset of items comprises all the items the user has interacted with in that context, and only a fraction of the items said user has not interacted with in that context. The items the user has not interacted with in the context, that are included in said subset of items, can be preferably chosen according to their score. For example, in a preferred option, the items whose scores are greater than a given threshold can be chosen. In another preferred option, the items whose scores are greater than the lowest scores of the items the user has interacted with in said context can be chosen. Also, in the subset, there can be a fixed number of items the user has not interacted with, for example, the same number of items the user has and has not interacted with, or said number of items can vary according to any other criteria.

Once the recommendation model has been optimized, said recommendation model is applied to an input user, an input context, and an input item list (said input item list typically being either the totality of items of the data set, or the subset used in the optimization algorithm). The scores of each item of the input items list for the input user and input context are looked up in the recommendation model, and sorted accordingly to determine the most relevant items for that situation. Finally, the most relevant items, sorted by score, are included in the ranked list.

In a second aspect of the present invention, a system of optimizing ranked lists of recommended items is disclosed. The system comprises context awareness means adapted to determine the context in which a user interacts with an item, providing context-aware implicit feedback to computation means that perform the ranked list optimization. The context awareness means are preferably located in a user device (for example a computer or a mobile phone), whereas the computing means are preferably located in an external server. The external server and the user device are connected by connection means through a communication network. The remote server preferably comprises a context processor adapted to retrieve additional context information about the interactions of the user. Additionally, the system preferably comprises purchasing means adapted to receive purchase orders from a user as a result of the ranked list of recommended items provided to said user, and to send said purchase order to an external service in charge of processing the order.

The computing means are configured to build a multidimensional data set with information of interactions from a plurality of users with a plurality of items in a plurality of contexts, and to use said multidimensional data set to build a mathematical recommendation model that assigns a score value to each combination of user, item and context. The scores of the plurality of items for each combination of user and context are sorted, and a ranked list for each combination of user and context is computed by choosing the items with the highest scores.

The recommendation model is computed by optimizing an objective function along the data set, wherein said objective function quantifies the relevance of the items selected in a ranked list, averaged over the plurality of users and the plurality of contexts. The objective function is a differentiable and continuous function, allowing to use fast optimization algorithms that require computing the derivative of the objective function. This reduces the computational load at the computing means, and allows providing ranked lists with more relevant items for a greater number of users, contexts, and items.

Notice that the objective function maximizes the relevance of the ranked lists, instead of just adapting to the values of a data-set, thus ensuring that the final ranked lists provided to each user in each scenario contain the most relevant items.

In a third aspect of the present invention, a computer program is disclosed, comprising computer program code means adapted to perform of the described method when said program is run on a computer, a digital signal processor, a field-programmable gate array, an application-specific integrated circuit, a micro-processor, a micro-controller, or any other form of programmable hardware.

With the disclosed method, system, and computer program, an efficient ranked list of recommended items is provided to each user and each scenario, using implicit context-aware historic information to ensure the relevance of the items included in the ranked list. Thanks to the optimization algorithm of the method, the design of the data set, the factorization into bidimensional matrices, and the selection of a reduced number of items for the optimization, the computational load is greatly reduced compared to conventional recommendation systems, reducing the time and resources required to implement the method of the invention, and allowing the method to use a larger data set. A larger data set allows taking into account a greater number of items and users, resulting in more useful recommendations, as well as considering a greater number or context variables to better particularize the recommendations to the actual scenario of the user.

These and other advantages will be apparent in the light of the detailed description of the invention.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

The matters defined in this detailed description are pr to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
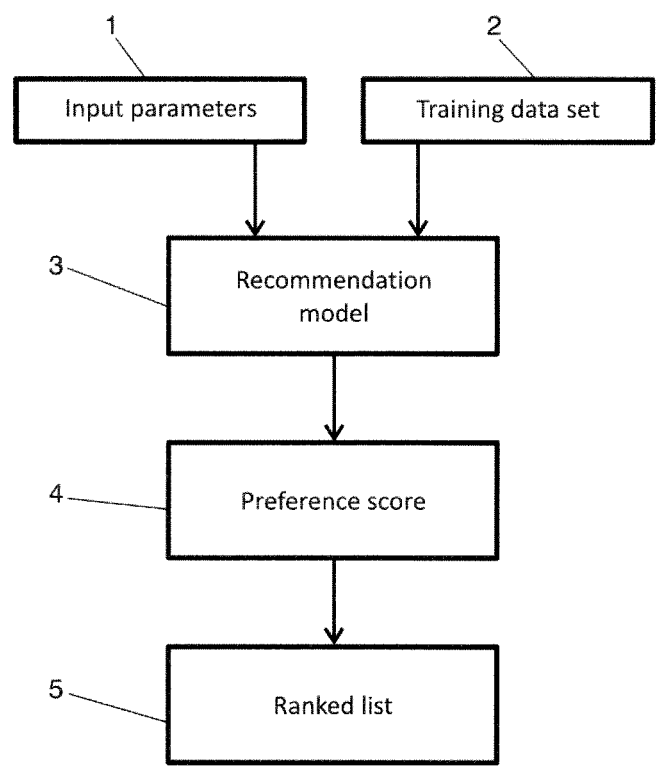
FIG. 1 shows a schematic diagram of the list optimization method according to a preferred embodiment of the present invention.

FIG. 1 shows a schematic diagram of the main steps of a preferred embodiment of the method of the invention. The method uses as input parameters 1 a context, a user, and a list of available items for recommendation, and the goal of the method is to provide a ranked list 5 of recommended items according to said input parameters 1. For that purpose, the method uses a training data set 2, from which a recommendation model is computed 3 by optimizing an objective function over the data set 2. The recommendation model 3 provides scores 4 that measure the predicted relevance of each item for the input user and in the input context, that is the predicted preference of the user towards purchasing or selecting said item in the a given context. Finally, the items are ranked according to their score 4 and the ranked list is provided to the user. Note that additional factors can be taken into account when building the ranked list besides their score 4, for example, which items the user has already interacted with in the past, other users recommendations, advertising campaigns, offers, etc.

Figure 2:
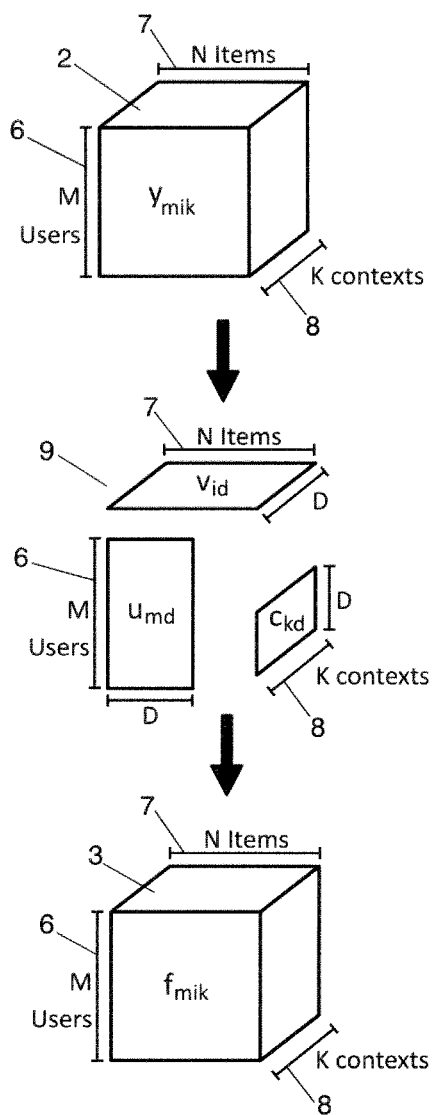
FIG. 2 presents the matrices and tensors involved in a preferred embodiment of the method of the present invention.

The dimensions and compositions of some of the elements involved in the method of the invention are further detailed in FIG. 2. The data set 2 is a multidimensional data set that comprises information of interactions of a plurality of users 6 with a plurality of items 7 in a plurality of contexts 8. In the embodiment shown in FIG. 2, the amount of users, items, and contexts considered are denoted with, M, N and K respectively. In particular, all context variables are comprised in a single dimension (entry) of the data set 2. For example, in a case comprising two context variables, such as time and place, a single dimension of the data set 2 comprises all the possible combinations of the two context variables. Therefore, the data set 2 is a tensor with three dimensions, and each of the elements of the data set 2 can be defined as $y_{mik}$, wherein m is the index of the m-th user among M users, i is the index of the i-th item among N items, and k is the index of the k-th context among K contexts. Element $y_{mik}$ denotes therefore the interactions of user m with item i in context k.

In order to reduce the computational load of the optimization algorithms, in an embodiment, the data set 2 is binary. If a user has interacted (e.g. purchased, used . . . ) with an item in a context, the corresponding element of the data set is '1', whereas if no interaction has taken place, the value of that element is '0'. However, other criteria can be applied to the quantification of the interactions in the data set 2. For example, each element can denote a number of interactions that have taken place, or be a numeric parameterization of some aspects of said interaction.

In particular, the data set 2 can comprise information about any of the following kinds of interaction, or any other implicit feedback: a click, mouse movements, a purchase, a use, an installation of an application, a browsing history, a usage history and a search pattern. Also, the context variable or variables comprised in the context dimension of the data set may comprise any of the following: time, date, season, location, activity, weather, emotional state, social network, user device, company and speed. Finally, the items can be any product or service that can be offered to the user, for example, movies, music, phone applications, etc. Of course, other types of interactions, contexts and/or items can be used as well In order to apply faster optimization algorithms, the multi dimensional data set 2 is factorized into as many two-dimensional matrices 9 as dimensions the data set 2 has. Following the previous example with a data set 2 formed by a three-dimensional tensor, the factorization results in three matrixes, U, V and C, all of them having D elements along one of their dimensions. Matrix U, with size M×D and matrix elements $u_{md}$, is the factorization of the user dimension. Matrix V, with size N×D and matrix elements $v_{id}$, is the factorization of the item dimension. Matrix C, with size K×D and matrix elements $c_{kd}$, is the factorization of the context dimension. The matrix elements $u_{md}$, $v_{id}$ and $c_{kd}$ are also called latent features. $U_m$ is used to denote a D-dimensional row vector which represents the features (matrix elements) for user m, $V_i$ to denote a D-dimensional row vector which represents the features for item i and $C_k$ to denote a D-dimensional row vector which represents the features for context k.

The recommendation model 3 comprises the scores $f_{mik}$ associated to each user, item and context, and is computed from the factorized matrices U, V and C as:

$$f_{mik} = \sum_{d=1}^{D} u_{md} v_{id} c_{kd}$$

Based on user's m preference over all the items under context type k, a recommendation list is generated by ranking all the items in a descending order of the computed scores. The average precision AP of this list is defined as:

$$AP_{mk} = \frac{1}{\sum_{i=1}^{N} y_{mik}} \sum_{i=1}^{N} \frac{y_{mik}}{r_{mik}} \times \sum_{j=1}^{N} y_{mjk} I(r_{mjk} \leq r_{mik})$$

where $r_{mik}$ is the rank in the ranked list of recommended item i for user m and context k, and I is a binary indicator function, which is equal to 1 if the condition is satisfied and 0 otherwise. AP can be averaged over the M users and K contexts (or over some of the users and the contexts) to compute the mean average precision (MAP):

$$MAP = \frac{1}{MK} \sum_{m=1}^{M} \sum_{k=1}^{K} AP_{mk}$$

However, the MAP function depends on the ranking of the items, which change in a non-smooth way with respect to the predicted scores, so standard optimization methods cannot be applied.

Instead of using the MAP function as an objective optimization algorithm, a continuous and differentiable approximation of the MAP function is used. For this purpose, the indicator function, which depends on the relative ranks of two items, is approximated by a continuous and smooth function which depends on the difference of the scores of the two items, in particular:

$$I(r_{mjk} \leq r_{mik}) \approx g(f_{mjk} - f_{mik}) = 1/(1 + e^{f_{mjk} - f_{mik}})$$

This approximation implies that the condition of item j being ranked higher than item i is more likely to be satisfied, if item j has a higher score that item i. In the same manner, the inverse function of the rank of an item is approximated by a continuous and smooth function relative to the score of that item, in particular:

$$\frac{1}{r_{mik}} \approx g(f_{mik}) = 1/(1 + e^{f_{mik}})$$

Hence, the smooth function that approximates the MAP measurement, and which is used in the optimization algorithm to compute the recommendation model is:

$$MAP' = \frac{1}{MK} \sum_{m=1}^{M} \sum_{k=1}^{K} \left[ \frac{1}{\sum_{i=1}^{N} y_{mik}} \sum_{i=1}^{N} y_{mik} g(f_{mik}) \times \sum_{j=1}^{N} y_{mjk} g(f_{mjk} - f_{mik}) \right]$$

The factorized optimization problem, with added Frobenius norms for regularization and without the constant terms of MAP' is therefore defined as:

$$L(U, V, C) = MK \times MAP' - \frac{\lambda}{2}(\|U\|^2 + \|V\|^2 + \|C\|^2)$$

wherein. L(U,V,C) would be the objective function to be maximized by the optimization algorithm, $\|\ \|$ is the Frobenius norm of a matrix, and $\lambda$ is a regularization parameter of the optimization problem. The regularization parameter $\lambda$ can be selected, for example, by using tuning techniques and cross-validation. Note that the objective function L(U,V,C) quantifies the average relevance of the ranked lists provided by the algorithm, and not just a straightforward fitting to the training data set.

Given a set of data, a local maximum can be obtained by alternatively performing gradient ascend on each of the factorized matrices at each step, while keeping the rest fixed (said equations will be referred to as equation 1 for users matrix U, equation 2 for context matrix C, equation 3 for items matrix V):

$$\frac{\partial L}{\partial U_m} = \sum_{k=1}^{K} \frac{1}{\sum_{i=1}^{N} y_{mik}} \sum_{i=1}^{N} y_{mik} [\delta_A(V_i \odot C_k) + \delta_B(V_j \odot C_k)] - \lambda U_m$$

$$\frac{\partial L}{\partial C_k} = \sum_{k=1}^{K} \frac{1}{\sum_{i=1}^{N} y_{mik}} \sum_{i=1}^{N} y_{mik} [\delta_A(U_m \odot V_i) + \delta_B(U_m \odot V_i)] - \lambda C_k$$

$$\frac{\partial L}{\partial V_i} = \sum_{m=1}^{M} \sum_{k=1}^{K} \frac{y_{mik}(U_m \odot C_k)}{\sum_{i=1}^{N} y_{mik}} \sum_{j=1}^{N} y_{mjk} [g'(f_{mik})g(f_{mjk} - f_{mik}) + \ldots +$$

$$(g(f_{mjk}) - g(f_{mik}))g'(f_{mjk} - f_{mik})] - \lambda V_i$$

where $\odot$ is the Hadamar or element-wise product and $g'(x)$ is the first derivative of $g(x)$ and where:

$$\delta_A := g'(f_{mik}) \sum_{j=1}^{N} y_{mjk} g(f_{m(j-i)k}) - g(f_{mik}) \sum_{j=1}^{N} y_{mjk} g'(f_{m(j-i)k})$$

$$\delta_B := g(f_{mik}) \sum_{j=1}^{N} y_{mjk} g'(f_{m(j-i)k})$$

and as stated before $f_{mik} := \langle U_m, V_i, C_k \rangle$ $f_{m(j-i)k} := \langle U_m, V_j - V_i, C_k \rangle$ Given that the data set usually presents very sparse data, and that |Y|>>M,K, the computational complexity of the two first gradient calculations is proportional to D|Y|, and therefore linear to the number of observed user-item interactions in the data set. This allows the method to be readily scaled to large amounts of users, data, and contexts, providing a better recommendation for each user and scenario.

However, the computational complexity of the last gradient is larger than quadratic to the number of items considered in the optimization algorithm. In order to avoid this computational bottleneck, the optimization algorithm is only applied to a representative subset of items. In the following text, the term "relevant item" refers to items from which the data set comprises implicit feedback from a user in a context, whereas "irrelevant item" refers to items from which no implicit feedback is available. In practice, the number of irrelevant items is much greater than the number of relevant items, but given the top-biased nature of AP measurements, the effect of top-ranked irrelevant items is more influential than the effect of lower-ranked irrelevant items. Therefore, to avoid the associated computational complexity, only a subset of irrelevant items is selected and used in the optimization algorithm. In particular, for a context and user with R relevant items, R irrelevant items are also selected. The R irrelevant items are sampled from irrelevant items whose score is greater than the lowest score among relevant items. Obviously, alternative criteria for selecting a subset of items to be considered in the optimization algorithm can be chosen within the scope of the present invention as claimed, for example, using a fixed score threshold, or using different proportions of relevant and irrelevant items.

As termination criteria for the optimization algorithm, conventional criteria can be used, such as the number of iterations or the convergence rate. Additionally, a MAP measurement can be used as termination criterion, as deteriorating values of MAP after a certain iteration indicate that further optimizing the approximation (MAP') does not contribute to further raising the MAP.

The described optimization algorithm for a fast maximization of the smooth approximation of the MAP function can be therefore summarized as follows:

The optimization algorithm uses as input a data set Y, a regularization parameter $\lambda$, a buffer size n, a learning rate $\gamma$ and a maximum number of iterations $t_{max}$.

Matrices U, V and C are initialized, for example with random values comprised between 0 and 1.

For each iteration t of the algorithm, new values for matrices U, V and C are computed according to the described gradient ascend algorithm (equations 1, 2 and 3 respectively), preferably applied to each row of said matrices individually.

That is, for m from 1 to M, the value of row m of matrix U in iteration t, $U_m^{(t)}$, is computed as:

$$U_m^{(t)} = U_m^{(t-1)} + \gamma \frac{\partial L}{\partial U_m^{(t-1)}}$$

For k from 1 to K, the value of row k of matrix C in iteration t, $C_k^{(t)}$, is computed as:

$$C_k^{(t)} = C_k^{(t-1)} + \gamma \frac{\partial L}{\partial C_k^{(t-1)}}$$

For m from 1 to M and k from 1 to K, a buffer with a subset of n items is selected according to any of the described criteria for example n/2 items with which user m has interacted with in context k, and n/2 items with which user m has not interacted with in context k). Then, for the rows corresponding to the items in the buffer, the value of row i of matrix V in iteration t, $V_i^{(t)}$, is computed as:

$$V_i^{(t)} = V_i^{(t-1)} + \gamma \frac{\partial L}{\partial V_i^{(t-1)}}$$

After each iteration, the iteration counter t is increased, and the termination criteria are verified. These termination criteria can be, for example, if the number of iterations has reached $t_{max}$, or if the MAP resulting from matrixes U, V and T of iteration t has deteriorated from a MAP computed in previous iterations. If any of the criteria is verified, the algorithm provides resulting matrices U, V and T as output. Otherwise, a new iteration is performed.

Figure 3:
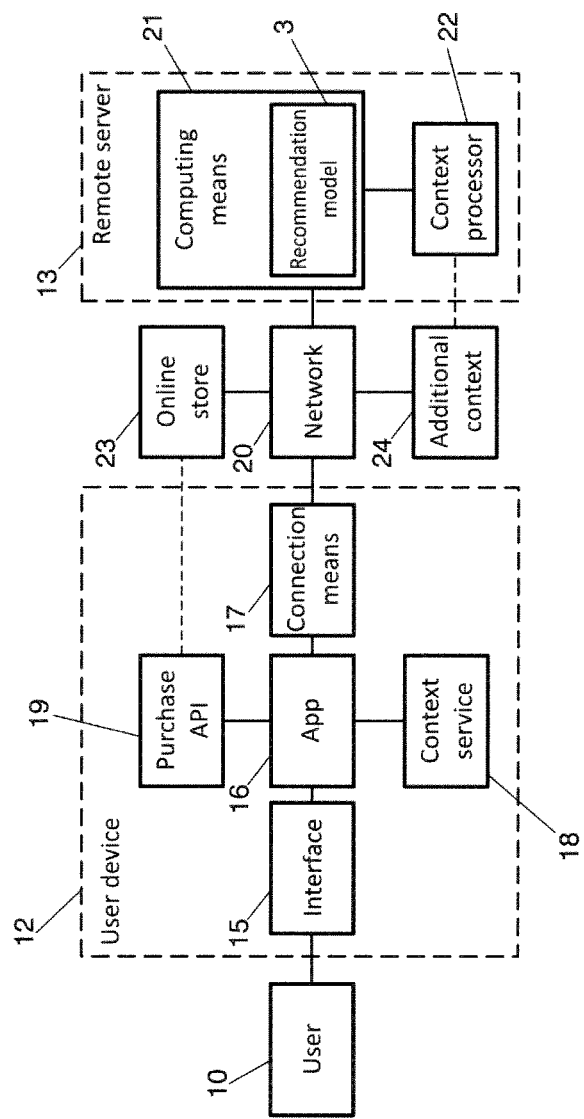
FIG. 3 shows a block diagram of a preferred embodiment of the system of the invention, distributed between a user device and a remote server.

FIG. 3 presents a particular embodiment of the system of the invention, which implements any embodiment of the described method of optimizing ranked lists of recommended items. In this particular embodiment, the method is implemented between a user device 12 and a remote server 13, although, although alternative distributions of computing elements could be implemented. The user device 12 comprises an application 16 that manages the part of the method implemented in said device 12. The user device further comprises an interface 15 to show information to a user 10 and receive commands from said user, connection means 17 to connect to the remote server 13 through a communication network 20, and context awareness means (that is, a context service) 18 that provide local information about the context of the user at a given instant, such as the time, date, speed, kind of user device, etc. The context service typically runs in the background of the user device 12, providing implicit feedback of the user 10 activities The remote server 13 comprises computing means 21, which optimize the recommendation model 3, and may comprise a context processor 22 which retrieves additional context data about the interactions of the users with the items, directly or through additional context sources. The context processor 22 may be connected to the additional context sources 24 directly, through the communication network 20, or through any other connection.

The system may comprise a purchase API (Application programming interface) 19 in the user end, configured to access an online store 23 or another external provider, in case the user makes a purchase order for an item suggested in the ranked list of recommended items. The purchase API 19 may be connected to the online store 19 through the communication network 18 or through any other connection.

When the application 16 is active, it detects interactions of the user 10 with the items considered in the data set (for example, which apps of a mobile phone the user 10 opens in different contexts), and sends the information about these interactions to the remote server 13, which can complement this information with any additional context variable provided by the context processor 22. Periodically, or triggered by any other event such as a user request, or a context change, the computing means 21 use the data set to update the recommendation model 3 according to the described method.

Then, when the user 10 request recommended items, or automatically triggered by a periodical recommendation or by a change in the context of the user 10, the application 10 sends to the computing means 21 the input parameters (identifier of the user and input context). These input parameters are completed if necessary at the remote server 12 (for example, additional context information provided by the context processor 22, or a sub-selection of items to be considered as input item list), and the scores for the items under the input context for the input user are calculated. The ranked list of recommended items is then built according to the scores of the items, and is provided to the application 16, which shows the recommended items to the user 10 through the interface 13. In another embodiment, some of all the remote server functions can be performed locally by the user device.

Summarizing, the described method and system therefore optimize the relevance of the ranked list provided to each user in each context, using implicit feedback, and with a low computational load that allows escalating the method to a large number of items, users, and contexts. This results in a better selection of relevant items for the recommended list, and a better ranking of said items than the ones provided by conventional methods. Also, by enabling the use of multiple context variables with diverse possible values, the ranked list is better adjusted to the particular scenario in which the user receives the recommendation.

A scenario where said ranking of items (e.g. applications) may be useful based on the user profile and context is, for example, the following: Imagine that an user arrives to London airport. In the designated area (screen, launcher) of the HTML5 enabled phone appears the metro application of London metro area. The user does not need to install anything, he even did not know that this application existed beforehand, but the proposed algorithm automatically detected that many people that arrive in the airport from other countries use this app so the phone, according to the results of the algorithm downloads and installs automatically said application to the mobile.

To do that, every certain period of time (e.g. 30 secs), the mobile phone polls its sensors to get the pone location. The exact values are converted (on the phone or on the server) into the high level contextual abstractions. For example, the GPS coordinates are converted into the several abstract notations: the pone is in an airport, the user's residence country is Spain, currently he is in United Kingdom. Based on the described algorithm and the current context, algorithm ranks all the available applications in the data base. The icons of the top list of the applications are automatically downloaded to your phone and displayed on the designated area. These are small images and links to the web application packaging such as (http://www.w3.org/TR/widgets/). Clicking on the icon proceeds to downloading needed packages to install application, installing application and launching it.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of optimizing an output ranked list of recommended items given an input user, an input item list, and an input context, comprising:
   providing a multidimensional data set that comprises information of interactions from a plurality of users with a plurality of items and in a plurality of contexts;
   factorizing the multidimensional data set into a number of two-dimensional matrices, the number of two-dimensional matrices being equivalent to the number of dimensions that the multidimensional data set has;
   computing a mathematical recommendation model by optimizing an objective function over the two-dimensional matrices into which the multidimensional data set has been factorized, the recommendation model comprising a score value for each combination of user, item and context;
   and computing the output ranked list by applying the computed recommendation model to the input user, input item list and input context,
   wherein the recommendation model further comprises a ranked list of recommended items for each user and context, being each ranked list determined by sorting the scores of the plurality of items for each user and context; and wherein the objective function is a continuous function with infinite continuous derivatives that quantifies a relevance of the recommended items of each ranked list of the recommendation model, calculated over at least some of the plurality of users and over at least some of the plurality of contexts.

2. A system of optimizing an output ranked list of recommended items given an input user and an input item list comprising context awareness means adapted to determine an input context of the user; an interface adapted to show information and receive commands from the input user; and computing means adapted to:

provide a multidimensional data set that comprises information of interactions from a plurality of users with a plurality of items and in a plurality of contexts;

factorize the multidimensional data set into a number of two-dimensional matrices, the number of two-dimensional matrices being equivalent to the number of dimensions that the multidimensional data set has;

compute a mathematical recommendation model by optimizing an objective function over the two-dimensional matrices into which the multidimensional data set has been factorized, the recommendation model comprising a score value for each combination of user, item and context;

and compute the output ranked list by applying the computed recommendation model to the input user, input item list and input context, wherein the recommendation model further comprises a ranked list of recommended items for each user and context, being each ranked list determined by sorting the scores of the plurality of items for each user and context; and in that the objective function is a continuous function with infinite continuous derivatives that quantifies a relevance of the recommended items of each ranked list of the recommendation model, calculated over at least some of the plurality of users and over at least some of the plurality of contexts.

3. A computer program comprising computer program code means adapted to optimize an output ranked list of recommended items by:

providing a multidimensional data set that comprises information of interactions from a plurality of users with a plurality of items and in a plurality of contexts;

factorizing the multidimensional data set into a number of two-dimensional matrices, the number of two-dimensional matrices being equivalent to the number of dimensions that the multidimensional data set has;

computing a mathematical recommendation model by optimizing an objective function over the two-dimensional matrices into which the multidimensional data set has been factorized, the recommendation model comprising a score value for each combination of user, item and context;

and computing the output ranked list by applying the computed recommendation model to the input user, input item list and input context, wherein the recommendation model further comprises a ranked list of recommended items for each user and context, being each ranked list determined by sorting the scores of the plurality of items for each user and context; wherein the objective function is a continuous function with infinite continuous derivatives that quantifies a relevance of the recommended items of each ranked list of the recommendation model, calculated over at least some of the plurality of users and over at least some of the plurality of contexts; and wherein said program is run on a computer, a digital signal processor, a field-programmable gate array, an application-specific integrated circuit, a micro-processor, a micro-controller, or any other form of programmable hardware.

4. The method of claim 1 wherein the multidimensional data set is a binary dataset that indicates whether each user has interacted with each item in each context.

5. The method of claim 1 wherein the data set comprises information about a plurality of context variables, and the information of interactions of each user and each item with all the context variables is comprised in a single entry of the multidimensional data set.

6. The method of claim 1 wherein the objective function is biased according to a rank of each item in the ranked list.

7. The method of claim 1 wherein the recommendation model is optimized with a gradient ascend algorithm.

8. The method of claim 1 wherein the step of computing the recommendation model further comprises selecting a subset of data from the multidimensional data set, being the objective function optimized over the subset of data.

9. The method of claim 1 wherein the interactions whose information is comprised in the multidimensional data set are selected from a group of implicit feedbacks comprising: a click, a mouse movements, a purchase, an installation of an application, a browsing history, an usage history and a search pattern.

10. The method of claim 1 wherein the plurality of contexts comprise at least one context variable selected from a group comprising: time, date, season, location, activity, weather, emotional state, social network, user device, company and speed.

11. The method of claim 1 wherein said calculation over at least some of the plurality of users and over at least some of the plurality of contexts is an average over at least some of the plurality of users and over at least some of the plurality of contexts.

12. The system according to claim 2 wherein the context awareness means are comprised in a user device, the computing means are comprised in a remote server, and the system further comprises connection means adapted to connect the user device and the remote server.

13. The system according to claim 2 wherein the remote server further comprises at least one of (a) a context processor to retrieve context information about the interactions between the plurality of users and the plurality of items, and purchasing means adapted to receive purchasing orders from the user through the interface and to send said purchasing orders to an external provider.

14. A digital data storage medium storing the computer program of claim 3.

15. The method of claim 6 wherein the objective function determines (a) a binary condition relative to the ranks in the ranked list of two given items, by a continuous and differentiable function relative to the scores of two given items in the recommendation model, (b) a rank in the ranked list of a given item by a continuous and differentiable function relative to a score of the given item in the recommendation model, or (c) both (a) and (b).

16. The method of claim 8 wherein the subset of data for a given user and a given context is formed by all the items the given user has interacted with in the given context, and by a subset of the items other than items the given user has interacted with in the given context.

17. The method of claim 16 wherein the subset of items other than items the given user has interacted with, is a plurality of items with a score greater than a given threshold.

18. The method of claim 16 wherein the chosen subset of items other than items the given user has interacted with is a plurality of items with a score greater than the lowest score among all the items the given user has interacted with in the given context.

* * * * *